United States Patent
Jiang (10) Patent No.: US 12,088,337 B2
(45) Date of Patent: Sep. 10, 2024

(54) SYSTEMS AND METHODS FOR DETECTING A LOCATION OF THE OPTICAL ELEMENTS CAUSING MULTIPATH INTERFERENCE IN AN OPTICAL LINK

(71) Applicant: HUAWEI TECHNOLOGIES CO., LTD., Guangdong (CN)

(72) Inventor: Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/963,341

(22) Filed: Oct. 11, 2022

(65) Prior Publication Data

US 2024/0120995 A1 Apr. 11, 2024

(51) Int. Cl.
| | |
|---|---|
| H04B 10/075 | (2013.01) |
| H04B 10/60 | (2013.01) |
| H04B 10/61 | (2013.01) |
| H04B 10/67 | (2013.01) |
| H04B 10/40 | (2013.01) |
| H04B 10/50 | (2013.01) |

(52) U.S. Cl.
CPC ......... *H04B 10/075* (2013.01); *H04B 10/614* (2013.01); *H04B 10/674* (2013.01); *H04B 10/40* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | | |
|---|---|---|---|---|
| 5,559,624 A | * | 9/1996 | Darcie | H04J 14/02 398/72 |
| 5,999,258 A | | 12/1999 | Roberts | |
| 7,415,206 B1 | | 8/2008 | Birk et al. | |
| 11,405,104 B1 | | 8/2022 | Hahn et al. | |
| 2010/0002983 A1 | * | 1/2010 | Kopp | G01M 3/047 385/12 |
| 2012/0045205 A1 | * | 2/2012 | Perron | H04B 10/0795 398/48 |
| 2012/0134663 A1 | * | 5/2012 | Wang | H04B 10/272 356/73.1 |
| 2015/0372752 A1 | * | 12/2015 | Liu | H04B 10/071 398/16 |
| 2016/0218802 A1 | * | 7/2016 | Ruchet | H04B 10/07955 |

(Continued)

*Primary Examiner* — Darren E Wolf
(74) *Attorney, Agent, or Firm* — BCF LLP (57) ABSTRACT

The disclosed systems and methods for detecting a location of reflection in an optical link comprising: i) receiving an optical signal; ii) receiving a plurality of first type of delayed optical signals corresponding to the optical signal; iii) determining a first type of time delays associated with each of the plurality of first type of delayed optical signals; iv) receiving a plurality of second type of delayed optical signals corresponding to the optical signal; v) determining a second type of time delays associated with the each of the plurality of second type of delayed optical signals; vi) computing relative delays from the second type of time delays; vii) comparing the relative delays with the first type of time delays; and viii) determining a location of a given optical element contributing to the reflections based on the given relative delay and the location of the AR.

18 Claims, 7 Drawing Sheets

(56) References Cited

U.S. PATENT DOCUMENTS

2020/0067595 A1     2/2020  Huang et al.
2020/0072703 A1*    3/2020  Roux ................. G01M 11/3145
2021/0048369 A1*    2/2021  Noguchi ............ G01M 11/3136

* cited by examiner

SYSTEMS AND METHODS FOR DETECTING A LOCATION OF THE OPTICAL ELEMENTS CAUSING MULTIPATH INTERFERENCE IN AN OPTICAL LINK

CROSS-REFERENCE TO RELATED APPLICATIONS

This is the first application filed for the instantly disclosed technology.

TECHNICAL FIELD

The present disclosure generally relates to optical communications and, in particular, to a system and a method for detecting a location of the optical elements causing multipath interference (MPI) in an optical link.

BACKGROUND

Generally, in an optical fiber link, multipath interference (MPI) occurs when an optical signal can take more than one path to reach the same place. There might be reflections in the optical fiber links, for example, due to poor connectors, splices, taps, optical amplifiers, optical fibers and/or isolators (referred to as optical elements). After an optical signal propagating in the optical fiber link is reflected back by a first optical element, a reflected version of the original optical signal is created. The reflected version of the original optical signal travels in opposite direction of the original signal. The reflected version of the original optical signal can be again reflected back by a second optical element in the same direction of the original signal, thereby creating a delayed version of the original optical signal.

This delayed optical signal can act as interference to the original optical signal. The interference can be constructive or destructive, according to the relative phase. The relative phase will depend the frequency of the signal and on the delay, which is in turn dependent on the difference in path lengths, i.e., the distance between the first optical element and the second optical element.

Several conventional techniques proposed in the art are focused on determining the MPI. However, in addition to determining the MPI, it would be beneficial to determine a location of the optical elements causing the MPI in optical link, so that a proper remedial action is performed on the optical elements to reduce the MPI.

With this said, there is an interest in developing systems and methods for detecting a location of the optical elements causing the MPI in the optical link.

SUMMARY

In general, a well-known issue with the optical links is multipath interference (MPI) introduced by the optical elements. The conventional techniques are focused on determining the MPI. However, in addition to determining the MPI, it would be beneficial to determine a location of the optical elements causing the MPI in optical link.

Developers of the present technology have devised systems and methods for detecting a location of the optical elements causing the MPI in the optical link.

In accordance with a first broad aspect of the present disclosure, there is provided a system for detecting a location of reflection in an optical link comprising: a non-transitory memory element having instructions thereon; one or more processors coupled to the non-transitory memory element to execute the instructions to cause the one or more processor to: receive an optical signal; receive a plurality of first type of delayed optical signals corresponding to the optical signal, the plurality of first type of delayed optical signals due to reflections of the optical signal between a plurality of optical elements present in the optical link; determine a first type of time delays associated with each of the plurality of first type of delayed optical signals; receive a plurality of second type of delayed optical signals corresponding to the optical signal, the plurality of second type of delayed optical signals due to reflections of the optical signal between an adjustable reflector (AR) and the plurality of optical elements, the AR being located at a predetermined location in the optical link; determine a second type of time delays associated with the each of plurality of second type of delayed optical signals; compute relative delays from the second type of time delays; compare the relative delays with the first type of time delays and identify a given relative delay that is closer to a given first type of time delay; and determine a location of a given optical element contributing to the reflections based on the given relative delay and the location of the AR In accordance with any embodiments of the present disclosure, the AR is located before a receiver in the optical link.

In accordance with any embodiments of the present disclosure the AR includes a 1×2 splitter, a 3 dB coupler, optical fiber, and a variable optical attenuator (VOA).

In accordance with any embodiments of the present disclosure the AR is configured to alter at least one of a state of polarization, a delay, and a reflectivity associated with the optical signal.

In accordance with any embodiments of the present disclosure based on the relative delays, the processor is further configured to generate a map of the plurality optical elements in the optical link.

In accordance with any embodiments of the present disclosure the plurality of optical elements includes one or more of connectors, splices, taps, optical amplifiers, optical fibers and isolators.

In accordance with any embodiments of the present disclosure the first type of time delays and the first type of time delays are determined using correlation technique.

In accordance with any embodiments of the present disclosure the first type of time delays and the first type of time delays are determined using direct detection technique.

In accordance with any embodiments of the present disclosure the processor computes the relative delays by taking a difference between two consecutive second type of time delays.

In accordance with a second broad aspect of the present disclosure, there is provided method for detecting a location of reflection in an optical link comprising: receiving an optical signal; receiving a plurality of first type of delayed optical signals corresponding to the optical signal, the plurality of first type of delayed optical signals are due to reflections of the optical signal between a plurality of optical elements present in the optical link; determining a first type of time delays associated with each of the plurality of first type of delayed optical signals; receiving a plurality of second type of delayed optical signals corresponding to the optical signal, the plurality of second type of delayed optical signals are due to reflections of the optical signal between an adjustable reflector (AR) and the plurality of optical elements, the AR being located at a predetermined location in the optical link; determining a second type of time delays associated with the each of the plurality of second type of delayed optical signals; computing relative delays from the second type of time delays; comparing the relative delays with the first type of time delays and identifying a given relative delay that is closer to a given first type of time delay; and determining a location of a given optical element contributing to the reflections based on the given relative delay and the location of the AR.

In accordance with any embodiments of the present disclosure further comprises altering at least one of a state of polarization, a delay, and a reflectivity associated with the optical signal.

In accordance with any embodiments of the present disclosure further comprises based on the relative delays, generating a map of the plurality optical elements in the optical link In accordance with any embodiments of the present disclosure the plurality of optical elements includes one or more of connectors, splices, taps, optical amplifiers, optical fibers and isolators.

In accordance with any embodiments of the present disclosure further comprises determining the first type of time delays and the first type of time delays using correlation technique.

In accordance with any embodiments of the present disclosure further comprises determining the first type of time delays and the first type of time delays using direct detection technique.

In accordance with any embodiments of the present disclosure further comprises computing the relative delays by taking a difference between two consecutive second type of time delays.

BRIEF DESCRIPTION OF THE FIGURES

Further features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes systems and methods for detecting a location of the optical elements causing the multipath interference (MPI) in the optical link.

Unless otherwise defined or indicated by context, all technical and scientific terms used herein have the same meaning as commonly understood by one of ordinary skill in the art to which the described embodiments appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the processor, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" processor and a "second" processor may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in alike fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes systems and methods for detecting a location of the optical elements causing the MPI in the optical link.

Figure 1:
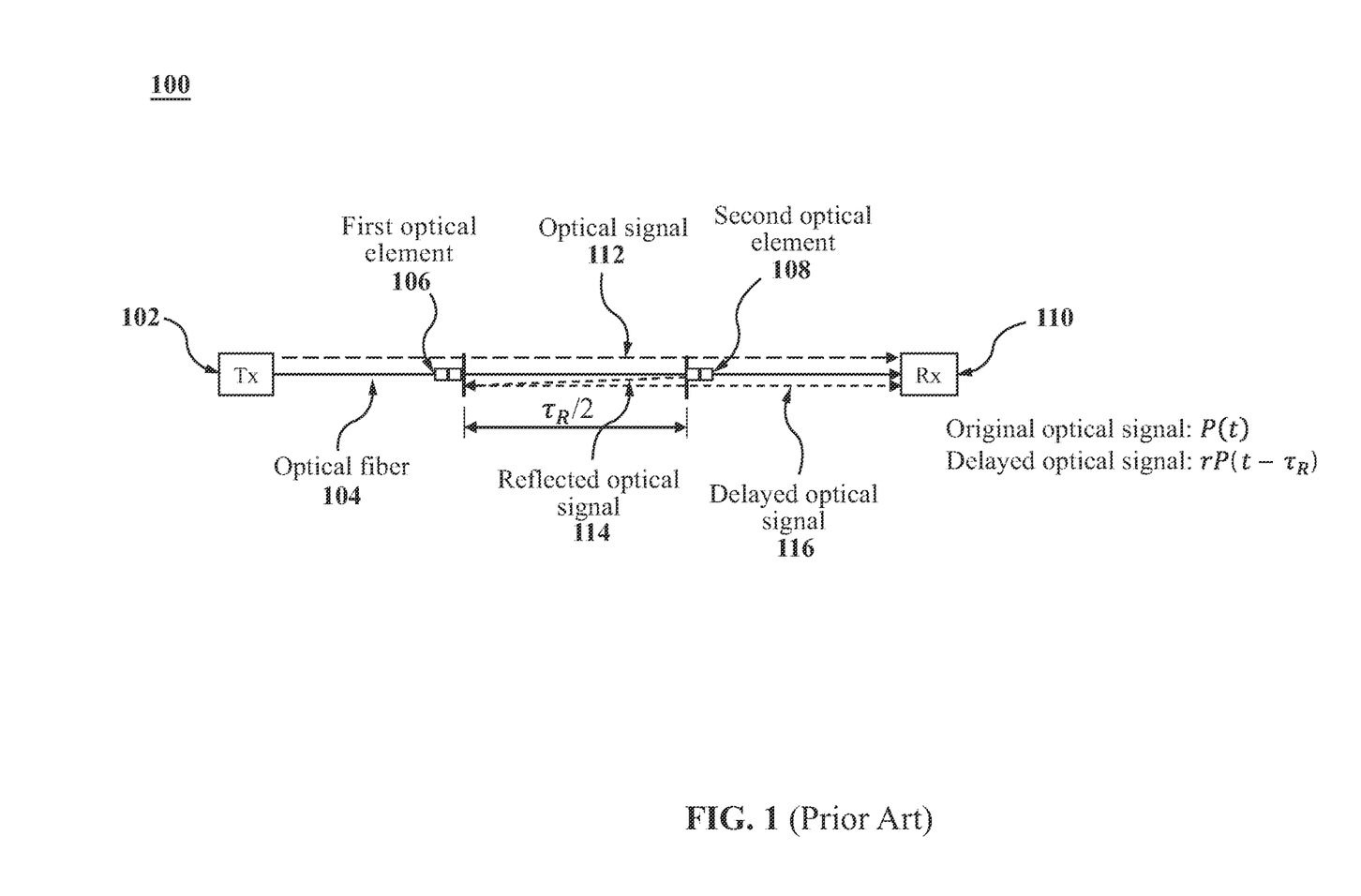
FIG. 1(Prior Art) illustrates a block diagram of conventional optical link.

FIG. 1(Prior Art) illustrates a block diagram of conventional optical link 100. As shown, the conventional optical link 100 includes a transmitter 102, an optical fiber 104, a first optical element 106, a second optical element 108, and a receiver 110. It is to be noted that the conventional optical link 100 may include additional known elements. However, such elements have been omitted from FIG. 1 for the purpose of simplicity.

The transmitter 102 may transmit an optical signal 112 towards the receiver 110 via the optical fiber 104. During the propagation, the optical signal 112 is propagated through various optical elements, for example, the first optical element 106 and the second optical element 108. It is to be noted that the first optical element 106 and the second optical element 108 may be any sort of connector, splice, tap, optical amplifier, isolator and/or any other suitable optical element.

In certain scenarios, where the first optical element 106 and the second optical element 108 may be of poor quality or are not properly installed, resulting in reflecting at least a portion of the optical signal 112. By way of example, the optical signal 112 is reflected by the second optical element 108. The reflected optical signal 114 travels in a direction opposite to the direction of the optical signal 112. The reflected optical signal 114 is reflected again by the first optical element 106 resulting in a delayed optical signal 116. The delayed optical signal 116 travels in a direction same as that of the optical signal 112.

This delayed optical signal 116 can act as interference to the original optical signal 112. The interference can be constructive or destructive, according to the relative phase. The relative phase will depend the frequency of the optical signal 112 and on the delay, which is in turn dependent on the difference in path lengths, i.e., a distance between the first optical element 106 and the second optical element 108. In other words, the delayed optical signal 116 travels additional distance as compared to a distance travelled by the optical signal 112. The optical signal 112 may be represented as P(t) and the delayed optical signal 116 is represented as $rP(t-\tau_R)$, where r is the strength of the reflection induced MPI and is represented as $r=r_1 r_2$, and $r_1$, $r_2$ are the reflection coefficient of the first optical element 106 and the second optical element 108 respectively. Also, $\tau_R$ represents a time delay in the delayed optical signal 116 due to this double reflection, r is the strength of this reflection induced MPI.

It is contemplated that the reflection induced MPI may severely degrades a performance of the optical signal 112 received by the receiver 110. To this end, a strength of the induced MPI should preferably be monitored by the receiver 110. In the event that the induced MPI causes severe performance degradation, it would be beneficial that the locations of the optical elements causing offending reflections to be identified.

Figure 2:
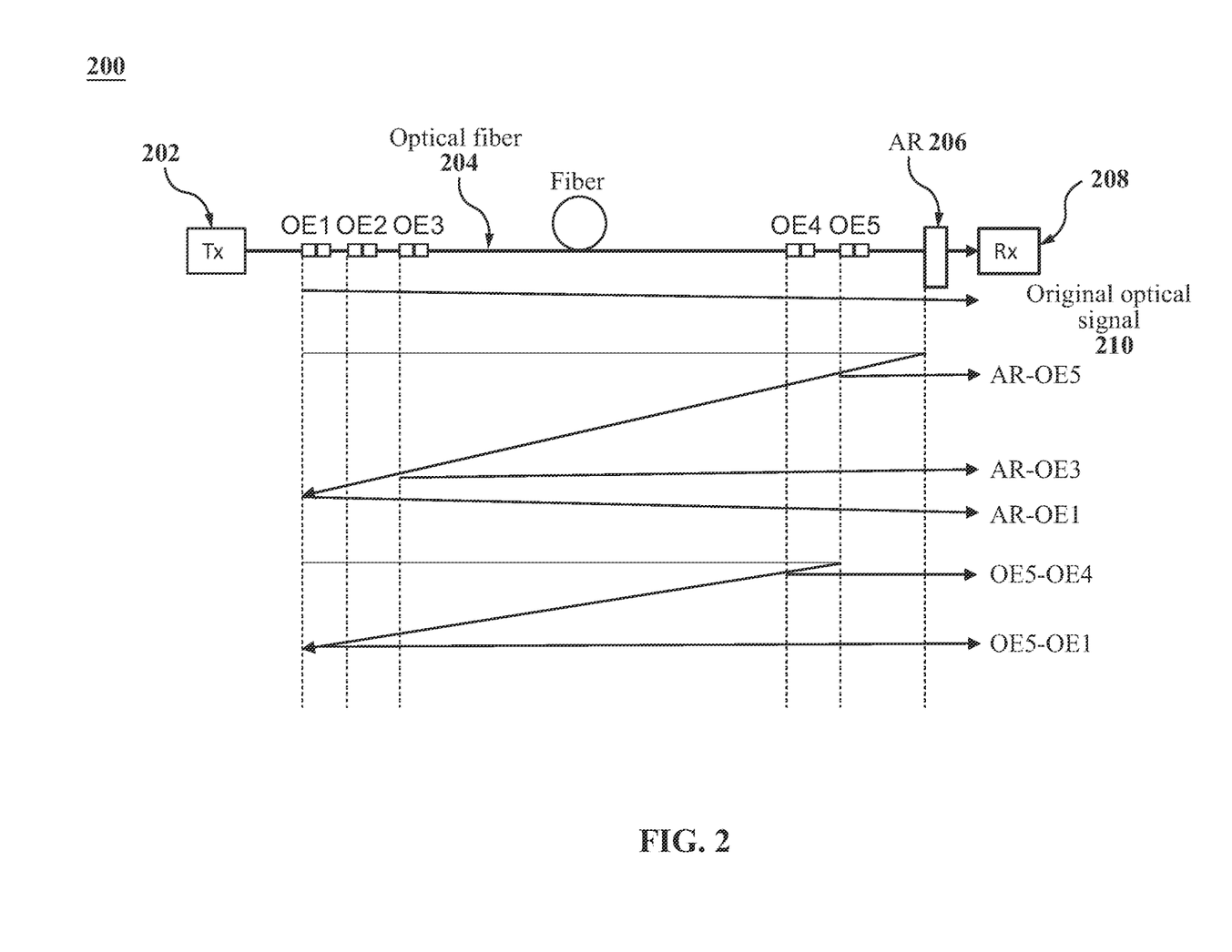
FIG. 2 illustrates an updated optical link, in accordance with various non-limiting embodiments of the present disclosure.

FIG. 2 illustrates an updated optical link 200, in accordance with various non-limiting embodiments of the present disclosure. As shown, the updated optical link 200 may include a transmitter 202, optical fiber 204, an adjustable reflector (AR) 206, a plurality of optical elements (for example, OE1, OE2, OE3, OE4, and OE5) and a receiver 208.

The transmitter 202 may include various components such as encoders, digital-to-analog convertors (DACs), electrical-to-optical convertors, laser sources, processors, controllers or the like. Each one of the plurality of optical elements OE1, OE2, OE3, OE4, and OE5 may be any type of suitable optical element such as, for example, connector splice, tap, optical amplifier, optical fiber, isolator or the like. The AR 206 may be any type of suitable reflector such as 3 dB coupler, optical circulator or the like (representative details about the AR 206 will be discussed later in the disclosure). The receiver 208 may include various components such as decoders, analog-to-digital convertors (ADCs), optical-to-electrical convertors, processors, controllers or the like. It is to be noted that the updated optical link 200 may include additional components, however such components have been omitted from the updated optical link 200 for the purpose of simplicity.

In certain non-limiting embodiments, the AR 206 may be inserted in the optical link 200 before the receiver 208. In some scenarios, the AR 206 may be inserted before using the updated optical link 200 for real-time traffic. In other scenarios, where an existing optical link is already live and having MPI based issues, the traffic over such existing link may be temporarily stopped and the AR 206 may be inserted before the receiver 208. Once the AR 206 is inserted in the existing optical link, the traffic may be resumed.

The AR 206 may assist in detecting a location of the optical elements causing the MPI in the updated optical link 200. More particularly, the AR 206 may split the original optical signal 210 travelling in the updated optical link 200 may be spilt into two portions. The first portion of the original optical signal 210 may be directed towards the receiver 208 and the second portion of the original optical signal 210 may be reflected towards the transmitter 202. The second portion of the original optical signal 210 may encounter reflections from the plurality of optical elements such as OE1, OE2, . . . OE5 that may be present in the updated optical link 200. Different optical signals reflected between the AR 206 and different optical elements may be represented for example as AR-OE5, AR-OE3, AR-OE1, etc. and may represent delayed versions of the original optical signal 210. By way of example, the delayed optical signal AR-OE5 may be a result of a portion of the original optical signal 210 reflected between the AR 206 and the OE5. Similarly, the delayed optical signal AR-OE3 may be a result of a portion of the original optical signal 210 reflected between the AR 206 and the OE3 and so on.

The receiver 208 may receive at least a portion of the original optical signal 210 and the delayed optical signals, for example, AR-OE5, AR-OE3, AR-OE1 or the like reflected between the AR 206 and the optical elements OE1, OE2, . . . OE5.

In addition to the above delayed optical signals AR-OE5, AR-OE3, AR-OE1, at least a portion of the original optical signal 210 may reflect between two or more optical elements OE1, OE2, . . . OE5. Different optical signals reflected between different optical elements may be represented for example as OE5-OE4, OE5-OE1, etc. and may represent delayed versions of the original optical signal 210. By way of example, the delayed optical signal OE5-OE4 may be a result of a portion of the original optical signal 210 reflected between the OE5 and the OE4. Similarly, the delayed optical signal OE5-OE1 may be a result of a portion of the original optical signal 210 reflected between the OE5 and the OE1 and so on.

Figure 3:
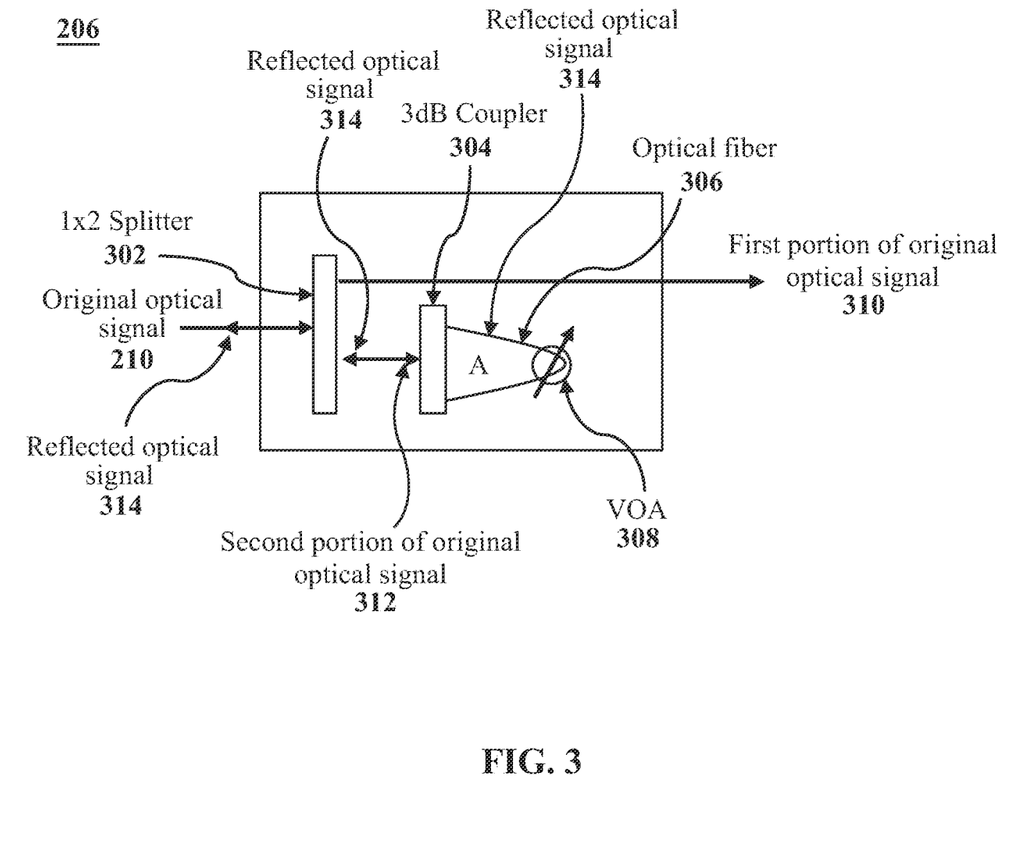
FIG. 3 illustrates a high-level functional block diagram of an adjustable reflector (AR), in accordance with various non-limiting embodiments of present disclosure.

FIG. 3 illustrates a high-level functional block diagram of the AR 206, in accordance with various non-limiting embodiments of present disclosure. As shown, the AR 206 may include a 1×2 splitter 302, a 3 dB coupler 304, optical fiber 306, and a variable optical attenuator (VOA) 308. It is to be noted that the AR 206 may include additional components. However, such components have been omitted from FIG. 3 for the purpose of simplicity.

The AR 206 may receive the original optical signal 210. The 1×2 splitter 302 may split the original optical signal 210 into a first portion of original optical signal 310 and a second portion of original optical signal 312. In certain non-limiting embodiments, an intensity of the first portion of the original optical signal 310 may be significantly higher than an intensity of the second portion of the original optical signal 312. In certain non-limiting embodiments, 1×2 splitter 302 may split the original optical signal 210 with any suitable ratio.

The 1×2 splitter 302 may forward the first portion of the original optical signal 310 towards the receiver 208. The 1×2 splitter 302 may forward the second portion of optical signal 312 towards the 3 dB coupler 304. The 3 dB coupler 304 may again split the second portion of original optical signal 312 into two optical signals. The 3 dB coupler 304 may forward the two optical signals over the optical fiber 306 towards the VOA 308. The VOA 308 may adjust the reflectivity of the second portion of original optical signal 312 to generate a reflected optical signal 314. The reflected optical signal 314 may be propagated back on the optical fiber 204 in a direction opposite to the first portion of original optical signal 310.

Additionally, the AR 206 may adjust a delay of the second portion of original optical signal 312 by altering a length of the connecting optical fiber 306. Also, the AR 206 may alter the polarization of the second portion of original optical signal 312 by manipulating the connecting optical fiber 306. The adjustments performed by the AR 206 to the second portion of original optical signal 312 may assist in determining the type of MPIs (for example, type I MPI or type II MPI) and improve the sensitivity in detecting MPIs.

Returning to FIG. 2, the receiver 208 may process the delayed optical signals OE5-OE4, OE5-OE1 to determine the respective MPIs. The MPIs associated with the delayed optical signals OE5-OE4 and OE5-OE1 may be referred to as type I MPIs. Additionally, the receiver 208 may process the delayed optical signals AR-OE5, AR-OE3, AR-OE1 to determine the respective MPIs. The MPIs associated with the delayed optical signals AR-OE5, AR-OE3, AR-OE1 may be referred to as type II MPIs.

It is to be noted that how the receiver 208 determines type I and type II MPIs should not limit the scope of present disclosure. By way of example, in one embodiment, the receiver 208 may determine type I and type II MPIs based on correlation method.

Assuming the original optical signal 210 represented as f(t), and a delayed optical signal is represented as $g(t)=rf(t-\tau_R)$. It is to be understood that the delayed optical signal may be the one reflected between AR 206 and at least one optical element, for example OE5. The delayed optical signal may also be the one reflected between at least two optical elements for example between OE5 and OE 4. The received signal by the receiver 208 may be represented as $F(t)=f(t)+$ rf(t−$\tau_R$). The receiver 208 may perform an autocorrelation on the received signal F(t) and the autocorrelation may be computed as:

$$R(\tau)=\int_{-\infty}^{+\infty}(t)F(t+\tau)dt$$

$$R(\tau)=\int_{-\infty}^{+\infty}[f(t)+g(t)]\times[f(t+\tau)+g(t+\tau)]dt$$

$$R(\tau)=\int_{-\infty}^{+\infty}[f(t)f(t+\tau)+f(t)g(t+\tau)+g(t)f(t+\tau)+g(t)g(t+\tau)]dt$$

$$R(\tau)=R_{ff}(\tau)+R_{fg}(\tau)+R_{gf}(\tau)+R_{gg}(\tau)$$

$$R(\tau)=(1+r^2)R_{ff}(\tau)+r(R_{ff}(c+\tau_R)+R_{ff}(\tau-\tau_R)) \quad (1)$$

The first term in the equation (1) may be the autocorrelation of the original optical signal f(t), or the delayed optical signal g(t). The second term in the equation (1) may be the cross correlation between the original optical signal f(t) and the delayed optical signal g (t). The autocorrelation may have a peak at $\tau=0$, whereas cross correlation may have peaks at $\tau=\tau_R$ and $\tau=-\tau_R$.

In the coherent detection technique as discussed above, the original optical signal f (t) and the delayed optical signal g(t) may be the intensity or field. In any case, the receiver 208 may determine peaks of the autocorrelation and the cross correlation of first and the second terms in equation (1).

In another embodiment, the receiver 208 may determine type I and type II MPIs based on direct detection method. In the direct detection method, the receiver 208 may detect MPI based on beating between the original optical signal f(t) and the delayed optical signal g(t). The receiver 208 may determine a state of polarization (SOP) of the original optical signal f(t) and the delayed optical signal g (t). When the SOP of the original optical signal f (t) and the delayed optical signal g (t) are aligned, the beating the two optical signals may the strongest.

In the direct detection technique as discussed above, the original optical signal f(t) and the delayed optical signal g(t) may be the intensity signals.

Figure 4:
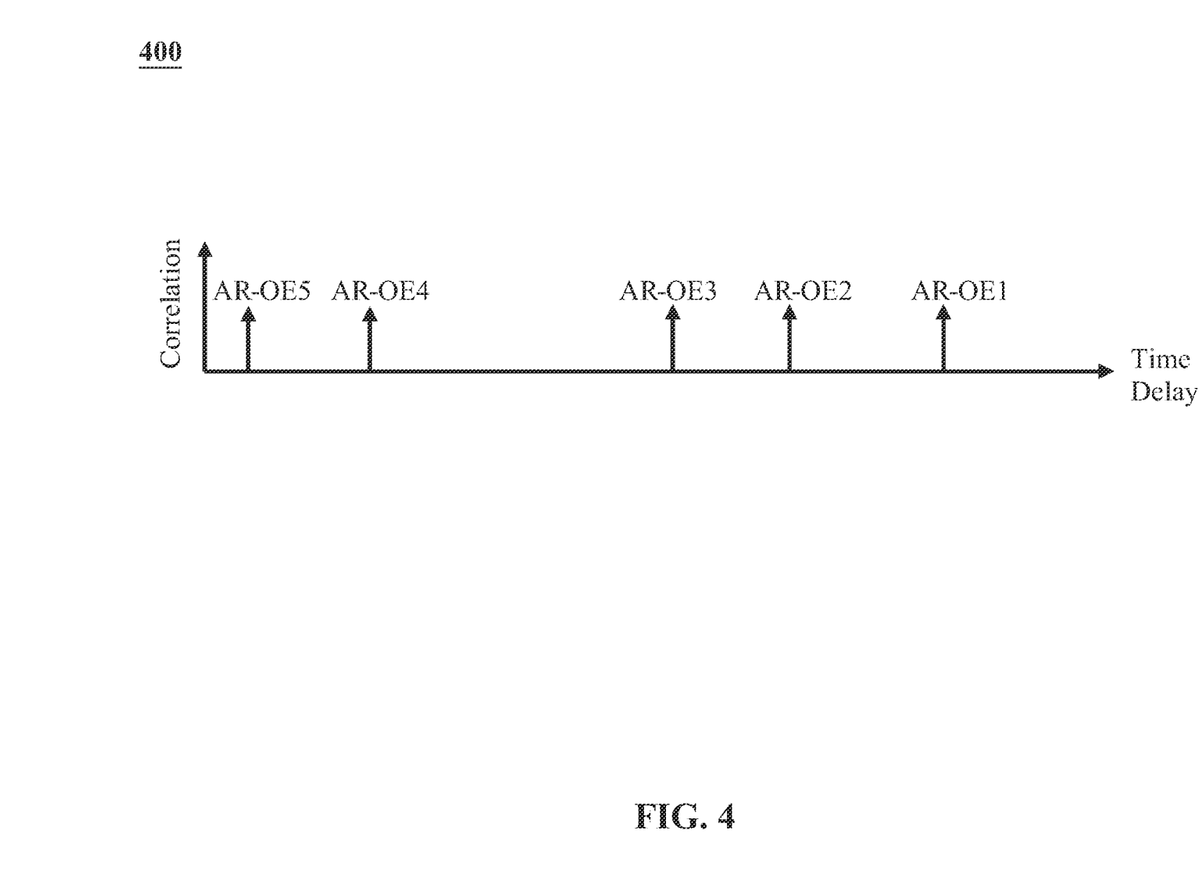
FIG. 4 illustrates correlation peaks corresponding to type II MPI detected by a receiver, in accordance with various non-limiting embodiments of the present disclosure.
Figure 5:
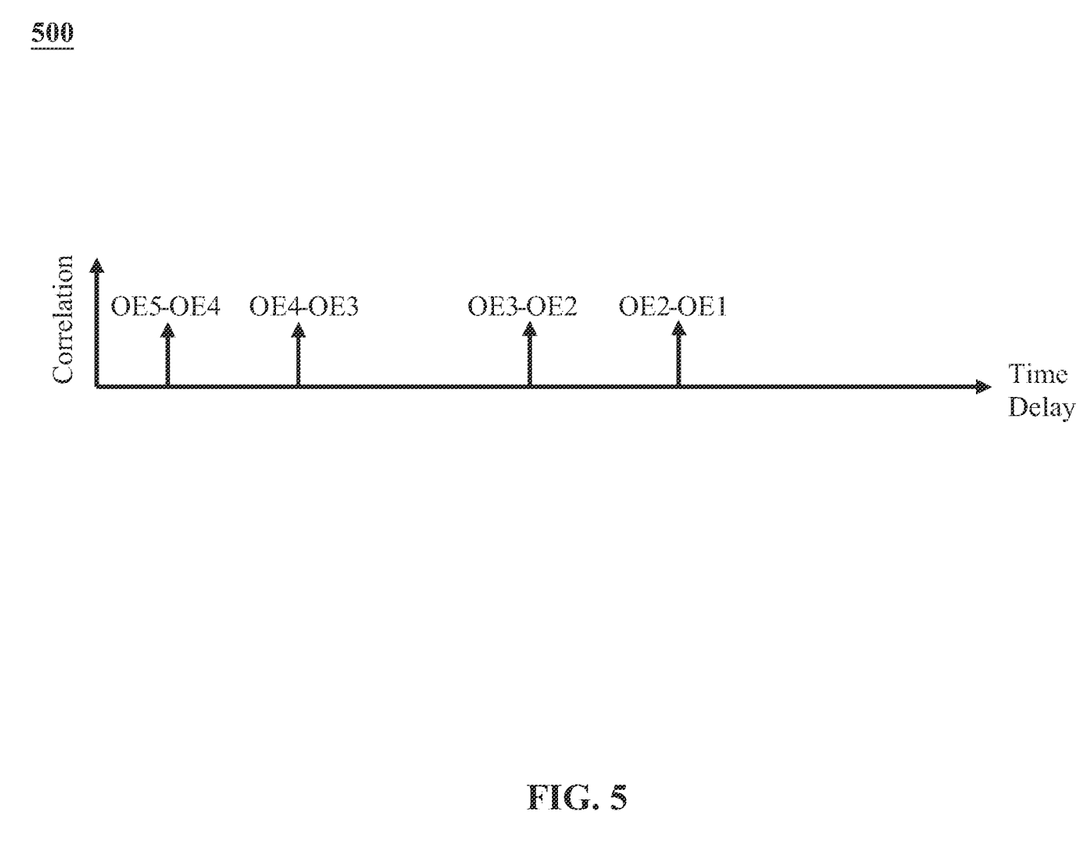
FIG. 5 illustrates correlation peaks corresponding to type I MPI detected by the receiver, in accordance with various non-limiting embodiments of the present disclosure.

FIG. 4 illustrates correlation peaks 400 corresponding to type II MPI detected by the receiver 208, in accordance with various non-limiting embodiments of the present disclosure. As shown, the correlation peaks 400 may correspond to the optical signal reflected between the AR 206 and one or more optical elements OE1, OE2 . . . OE5. FIG. 5 illustrates correlation peaks 500 corresponding to type I MPI detected by the receiver 208, in accordance with various non-limiting embodiments of the present disclosure. As shown, the correlation peaks 500 may correspond to the optical signal reflected between different optical elements OE1, OE2 . . . OE5. It is to be noted that instead of magnitude of the correlation peaks, a timing of the correlation peaks would be sufficient to determine the location of the optical elements causing the MPI in optical link 200.

To clearly distinguish the type II MPIs from type I MPIs, the reflectivity, SOP and/or delay of the AR 206 may be altered resulting in change in the type II MPIs while the type I MPIs still remain the same. The reflectivity of the AR 206 may be very high, and this high reflectivity of AR 206 may assist in detecting even the relatively low optical link reflection events. Essentially with the assistance of the AR 206, a map of the optical link reflections may be generated accurately.

In certain non-limiting embodiments, in addition to determining the locations of the optical elements, the receiver 208 may generate the map for all reflections in the optical link 200 for MPI localization. The map may include information such as number of optical elements in the optical link 200, location of the optical elements in the optical link 200, distance between the two optical elements or the like.

In certain non-limiting embodiments, the receiver 208 may compute the type I and type II MPIs and the associated delays. The delays associated with the type I MPI may be represented as $\tau_{OEi-OEj}$, where i and j represents the ith and jth optical elements in the optical link 200. In other words, the term $\tau_{OEi-OEj}$ may represent a time delay faced by the original optical signal 210 due to reflection between the ith and jth optical elements. The delays associated with the type II MPI may be represented as $\tau_{AR-OEi}$. In other words, the term $\tau_{AR-OEi}$ may represent a time delay faced by the original optical signal 210 due to reflection between the AR 206 and the ith optical element in the optical link 200.

The receiver 208 may compute the relative delays between all type II MPIs and the relative delays may be represented as:

$$\tau'_{OEi-OEj}=\tau_{AR-OEi}-\tau_{AR-OEj} \quad (2)$$

In certain non-limiting embodiments, in order to determine the location of the location of the optical elements (for example, OE1, OE2 . . . OE5) causing the MPI in the optical link 200, the receiver 208 may compare the relative delays $\tau'_{OEi-OEj}$ with the delays $\tau_{OEi-OEj}$ associated with the type I MPIs. Based on the comparison, the receiver 208 may identify the relative delay, for example, $\tau'_{OE5-OE4}$, closest to the delay, for example, $\tau_{OE5-OE4}$. Once the closest relative delay is identified, the distance of the associated optical elements for example, OE5 and OE4 causing the MPI may be determined using type II MPI. The location of the AR 206 is known and the delays $\tau_{AR-OEi}$ and $\tau_{AR-OEj}$ associated with ith and jth optical elements are known or computed. Based on the location of the AR 206 and the delays $\tau_{AR-OEi}$ and $\tau_{AR-OEj}$, the location of the ith and jth optical elements may be identified by the receiver 208.

Once the location of the optical elements causing the MPI, the optical elements could be repaired or replaced to reduce the effect of MPI and to improve the performance of the optical link 200.

In certain non-limiting embodiments, when the distance of the reflections of the original optical signal 210 from the AR 206 alone may not be sufficient to locate the physical location of the optical elements in the optical link 200, an intentional reflector (not illustrated) may be inserted along the optical link 200 to assist determining the physical location of the optical elements.

Figure 6:
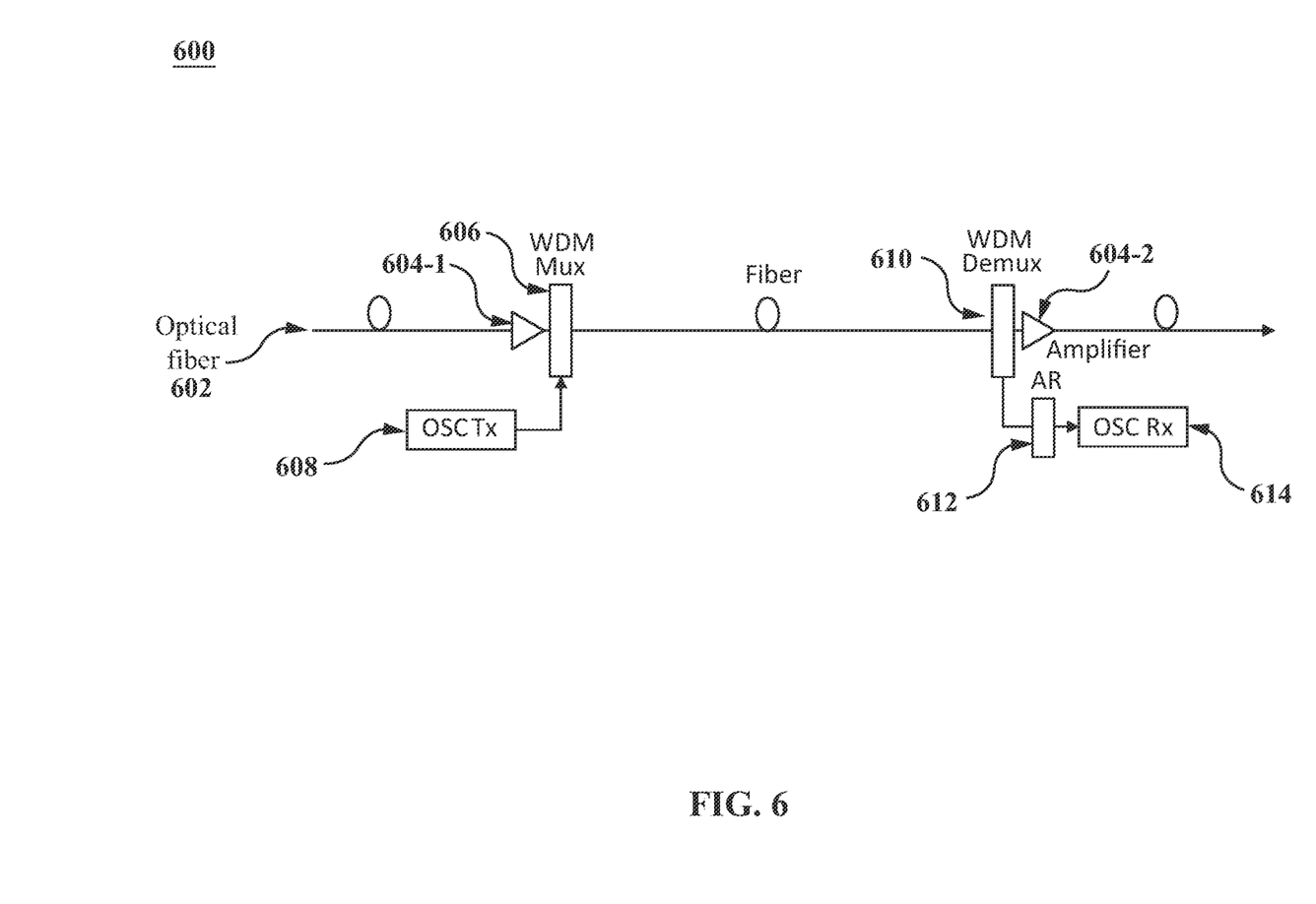
FIG. 6 illustrates another representative example of the updated optical link, in accordance with various non-limiting embodiments of the present disclosure.

FIG. 6 illustrates another representative example of the updated optical link 600, in accordance with various non-limiting embodiments of the present disclosure. the updated optical link 600 may be a part of multiple span optical link. For the purpose of simplicity, only one span is illustrated, however, in various non-limiting embodiments, the techniques discussed above may be equally applicable to multiple span optical links.

As shown, the updated optical link 600 may include optical fiber 602, optical amplifiers 604-1 and 604-2, a wavelength division multiplexer (WDM) 606, an out-of-Band Optical Supervisory Channel (OSC) transmitter 608, a WDM demultiplexer 610, an AR 612 (implemented similar to the AR 206), and an OSC receiver 614. In certain non-limiting embodiments, the OSCs may be used for reflection detection purposes. The AR 612 may be configured to introduce deliberate reflections to an optical signal traveling in the updated optical link 600. The OSC receiver 614 may operate in a similar manner to the receiver 208 to determine the location of the sources causing the MPIs in the updated optical link 600

Figure 7:
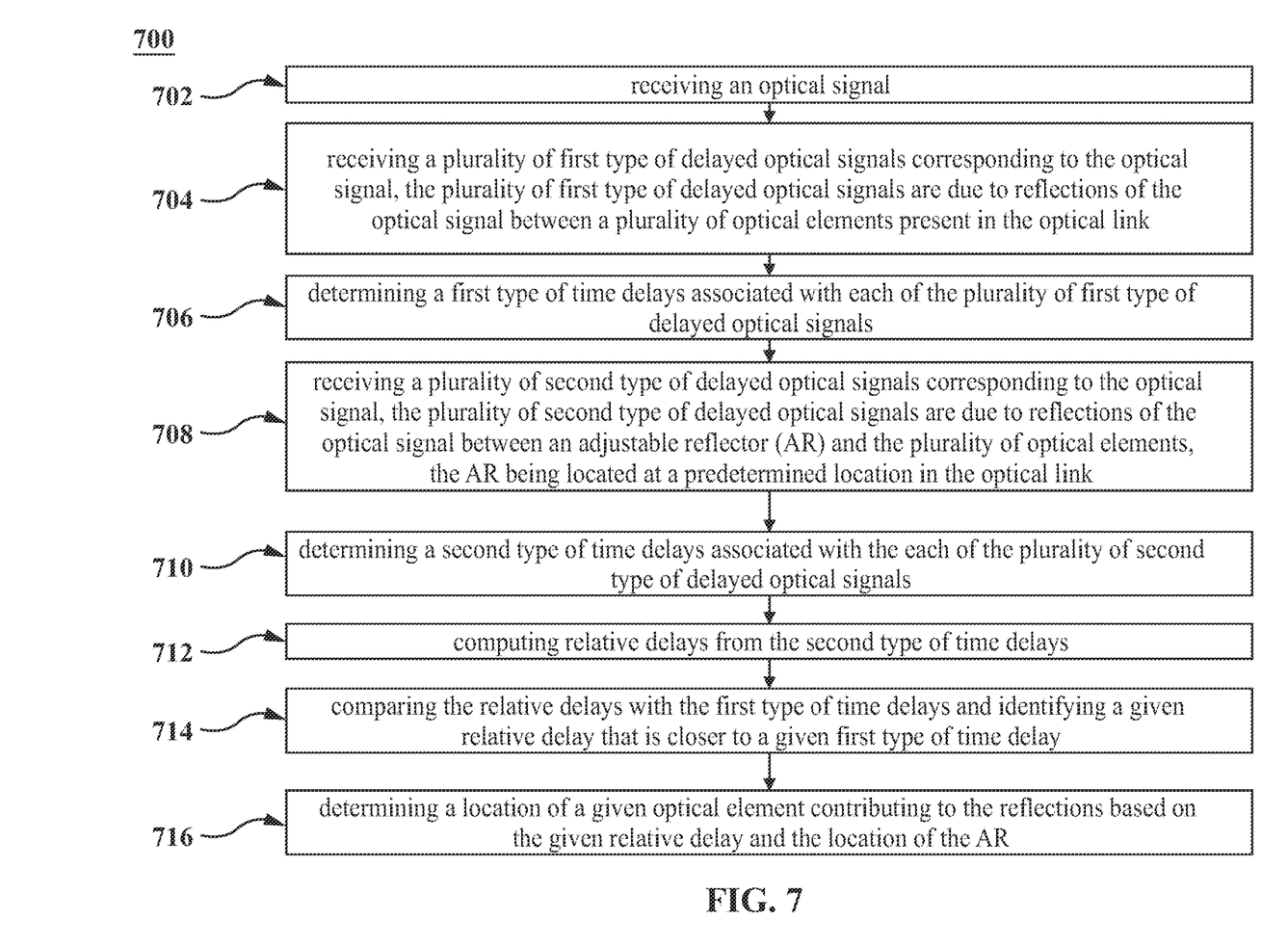
FIG. 7 illustrates a flowchart of a process for detecting a location of the optical elements causing multipath interference (MPI) in the optical link.

FIG. 7 illustrates a flowchart of a process 700 for detecting a location of the optical elements causing multipath interference (MPI) in the optical link. The process commences at step 702 where a receiver receives an optical signal. As previously noted, the receiver 208 (as shown in FIG. 2) receives the original optical signal 210.

The process 700 advances to step 704 where receiver 208 receives a plurality of first type of delayed optical signals corresponding to the optical signal. The plurality of first type of delayed optical signals are due to reflections of the optical signal between a plurality of optical elements present in the optical link. As discussed previously, the receiver 208 receives the delayed optical signals OE5-OE4, OE5-OE1, or the like. The delayed optical signals OE5-OE4, OE5-OE1 or the like are due to reflection of the original optical signal 210 between the optical elements OE1, OE2 . . . OE5.

The process 700 advances to step 706 where the receiver 208 determines a first type of time delays associated with each of the plurality of first type of delayed optical signals. As previously discussed, the receiver 208 determines the time delays $\tau_{OEi\text{-}OEj}$ associated with the delayed optical signals OE5-OE4, OE5-OE1 or the like, where i and j represents the ith and jth optical elements in the optical link 200.

The process 700 advances to step 708 where the receiver 208 receives a plurality of second type of delayed optical signals corresponding to the optical signal, the plurality of second type of delayed optical signals are due to reflections of the optical signal between an adjustable reflector (AR) and the plurality of optical elements, the AR being located at a predetermined location in the optical link. As discussed above, the receiver 208 receives the delayed optical signals AR-OE5, AR-OE3, AR-OE1, or the like. The delayed optical signals AR-OE5, AR-OE3, AR-OE1, or the like are due to reflection of the original optical signal 210 between the AR 206 and the optical elements OE1, OE2 . . . OE5.

The process 700 proceeds to step 710 where the receiver 208 determines a second type of time delays associated with the each of the plurality of second type of delayed optical signals. As previously noted, the time delays $\tau_{AR\text{-}OEi}$ associated with the delayed optical signals AR-OE5, AR-OE3, AR-OE1, or the like, i represents the ith optical element in the optical link 200.

The process 700 advances to step 712 where the receiver 208 computes relative delays from the second type of time delays. As discussed previously, the receiver 208 may compute the relative delays between all type II MPIs and the relative delays may be represented as: $\tau'_{OEi\text{-}OEj} = \tau_{AR\text{-}OEi} - \tau_{AR\text{-}OEj}$.

The process 700 proceeds to step 714 where the receiver 208 compares the relative delays with the first type of time delays and identifying a given relative delay that is closer to a given first type of time delay. As previously noted, the receiver 208 compares the relative delays $\tau'_{OEi\text{-}OEj}$ with the delays $\tau_{OEi\text{-}OEj}$ associated with the type I MPIs. Based on the comparison, the receiver 208 may identify the relative delay, for example, $\tau'_{OE5\text{-}OE4}$, closest to the delay, for example, $\tau_{OE5\text{-}OE4}$.

Finally at step 716, the receiver 208 determines a location of a given optical element contributing to the reflections based on the given relative delay and the location of the AR. As discussed above, once the closest relative delay is identified, the distance of the associated optical elements for example, OE5 and OE4 causing the MPI may be determined using type II MPI. The location of the AR 206 is known and the delays $\tau_{AR\text{-}OEi}$ and $\tau_{AR\text{-}OEj}$ associated with ith and jth optical elements are known or computed. Based on the location of the AR 206 and the delays $\tau_{AR\text{-}OEi}$ and $\tau_{AR\text{-}OEj}$, the location of the ith and jth optical elements may be identified by the receiver 208.

It is to be understood that the operations and functionality of the updated optical link 200, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A system for detecting a location of reflection in an optical link comprising:
    a non-transitory memory element having instructions thereon;
    one or more processors coupled to the non-transitory memory element to execute the instructions to cause the one or more processor to:
        receive an optical signal;
        receive a plurality of first type of delayed optical signals corresponding to the optical signal, the plurality of first type of delayed optical signals due to reflections of the optical signal between a plurality of optical elements present in the optical link;
        determine a first type of time delays associated with each of the plurality of first type of delayed optical signals;
        receive a plurality of second type of delayed optical signals corresponding to the optical signal, the plurality of second type of delayed optical signals due to reflections of the optical signal between an adjustable reflector (AR) and the plurality of optical elements, the AR being located at a predetermined location in the optical link;
        determine a second type of time delays associated with the each of plurality of second type of delayed optical signals;
        compute relative delays from the second type of time delays, computing the relative delays comprising determining:

$$\tau'_{OEi\text{-}OEj} = \tau_{AR\text{-}OEi} - \tau_{AR\text{-}OEj},$$

where OE is the optical element, AR is the adjustable reflector, and $\tau$ is the time of the delayed optical signals;
        compare the relative delays with the first type of time delays and identify a given relative delay that is closer to a given first type of time delay; and
        determine a location of a given optical element contributing to the reflections based on the given relative delay and the location of the AR.

2. The system of claim 1, wherein the AR is located before a receiver in the optical link.

3. The system of claim 1, wherein the AR includes a 1×2 splitter, a 3dBcoupler, optical fiber, and a variable optical attenuator (VOA).

4. The system of claim 1, wherein the AR is configured to alter at least one of a state of polarization, a delay, and a reflectivity associated with the optical signal.

5. The system of claim 1, wherein based on the relative delays, the one or more processors are further caused to generate a map of the plurality optical elements in the optical link.

6. The system of claim 1, wherein the plurality of optical elements includes one or more of connectors, splices, taps, optical amplifiers, optical fibers and isolators.

7. The system of claim 1, wherein the first type of time delays and the first type of time delays are determined using correlation technique.

8. The system of claim 1, wherein the first type of time delays and the first type of time delays are determined using direct detection technique.

9. The system of claim 1, wherein the one or more processors are caused to compute the relative delays by taking a difference between two consecutive second type of time delays.

10. A method for detecting a location of reflection in an optical link comprising:
receiving an optical signal;
receiving a plurality of first type of delayed optical signals corresponding to the optical signal, the plurality of first type of delayed optical signals are due to reflections of the optical signal between a plurality of optical elements present in the optical link;
determining a first type of time delays associated with each of the plurality of first type of delayed optical signals;
receiving a plurality of second type of delayed optical signals corresponding to the optical signal, the plurality of second type of delayed optical signals are due to reflections of the optical signal between an adjustable reflector (AR) and the plurality of optical elements, the AR being located at a predetermined location in the optical link;
determining a second type of time delays associated with the each of the plurality of second type of delayed optical signals;
compute relative delays from the second type of time delays, computing the relative delays comprising determining:

$$\tau'_{OEi\text{-}OEj} = \tau_{AR\text{-}OEi} - \tau_{AR\text{-}OEj},$$

where OE is the optical element, AR is the adjustable reflector, and t is the time of the delayed optical signals;
comparing the relative delays with the first type of time delays and identifying a given relative delay that is closer to a given first type of time delay; and
determining a location of a given optical element contributing to the reflections based on the given relative delay and the location of the AR.

11. The method of claim 10, wherein the AR is located before a receiver in the optical link.

12. The method of claim 10, wherein the AR includes a 1×2 splitter, a 3dBcoupler, optical fiber, and a variable optical attenuator (VOA).

13. The method of claim 10 further comprising altering at least one of a state of polarization, a delay, and a reflectivity associated with the optical signal.

14. The method of claim 10 further comprising based on the relative delays, generating a map of the plurality optical elements in the optical link.

15. The method of claim 10, wherein the plurality of optical elements includes one or more of connectors, splices, taps, optical amplifiers, optical fibers and isolators.

16. The method of claim 10 further comprising determining the first type of time delays and the first type of time delays using correlation technique.

17. The method of claim 10 further comprising determining the first type of time delays and the first type of time delays using direct detection technique.

18. The method of claim 10 further comprising computing the relative delays by taking a difference between two consecutive second type of time delays.

* * * * *